Dec. 5, 1933.     G. H. GLEASON     1,937,757
MANUFACTURE OF SODIUM NITRATE
Filed July 10, 1928     2 Sheets-Sheet 2
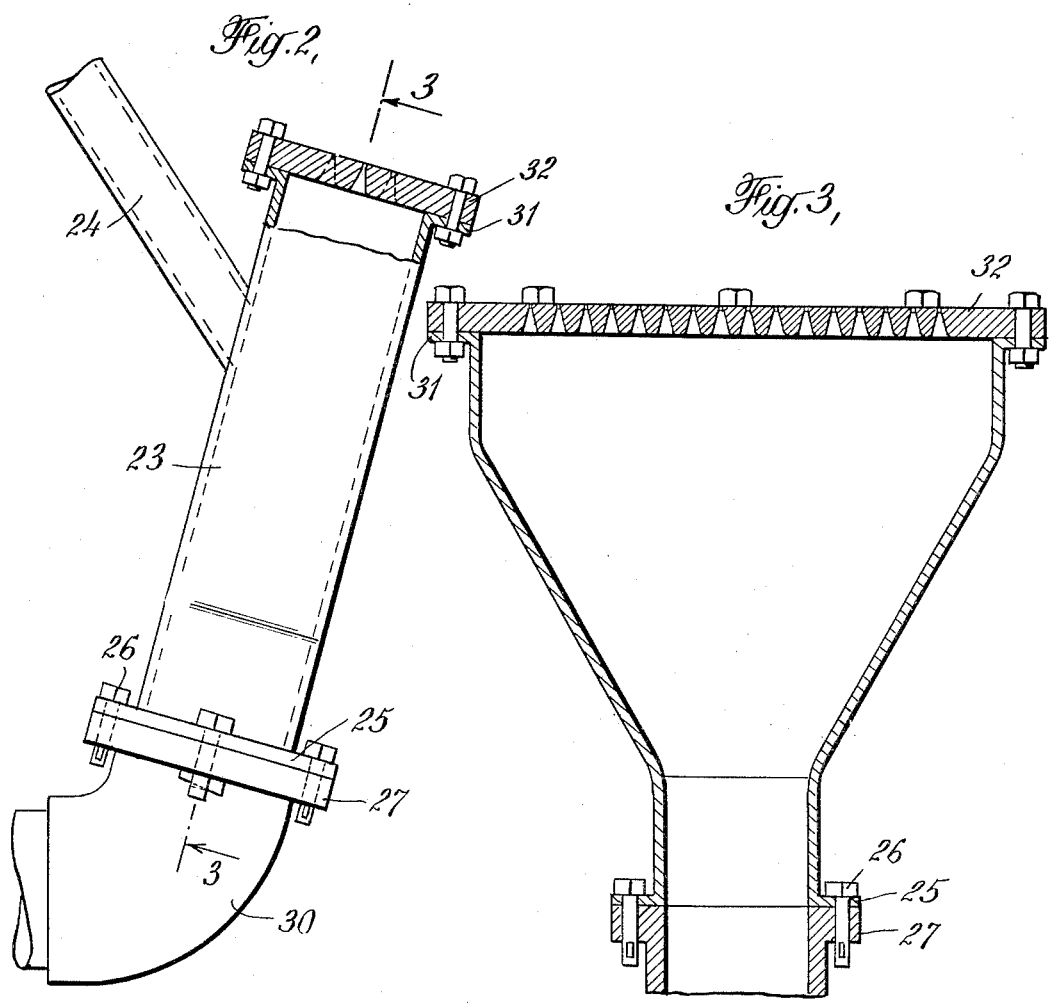
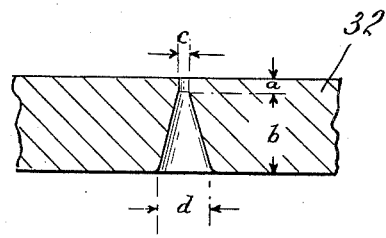
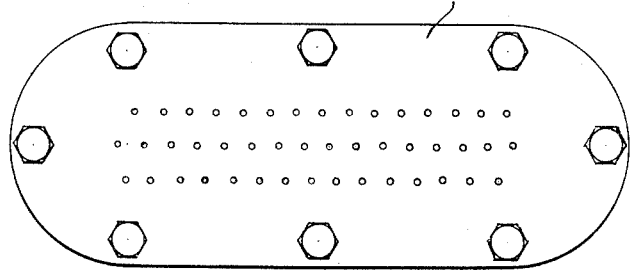
INVENTOR
George Homer Gleason
BY
Pennie, Davis, Marvin & Edmonds
HIS ATTORNEYS Patented Dec. 5, 1933

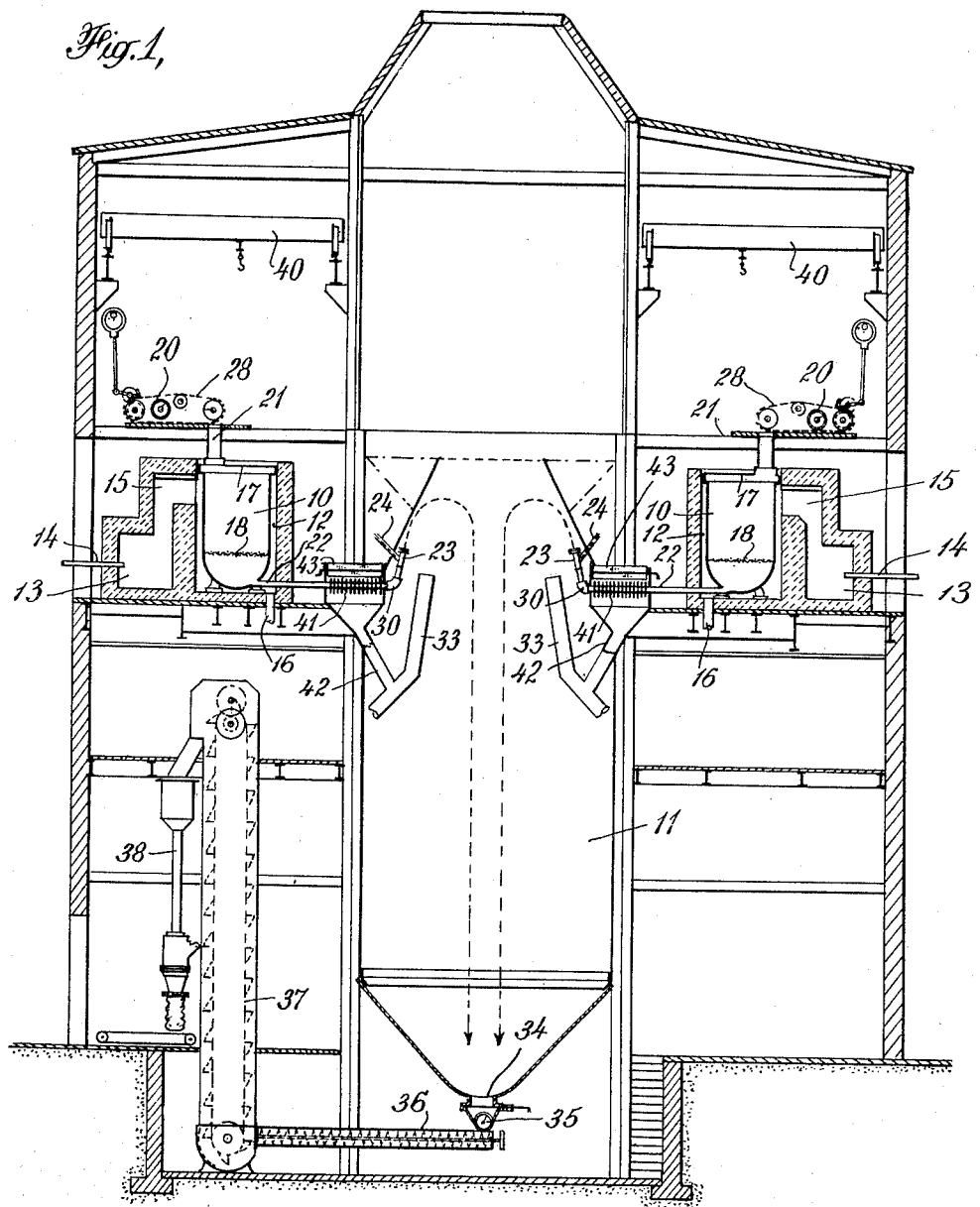

1,937,757

UNITED STATES PATENT OFFICE 1,937,757

MANUFACTURE OF SODIUM NITRATE

George Homer Gleason, Montclair, N. J., assignor, by mesne assignments, to Compania Salitrera Anglo-Chilena, Valparaiso, Chile, a corporation of Chile Application July 10, 1928. Serial No. 291,640

3 Claims. (Cl. 23—38)

This invention relates to the treatment of commercial sodium nitrate and has for an object the provision of an improved method and apparatus by means of which commercial sodium nitrate may be converted to such forms as to minimize its caking tendencies. The invention further contemplates the production of a new and improved sodium nitrate product which is particularly suitable for use in agriculture and the chemical industries.

According to the process of the invention, commercial sodium nitrate is melted, and the molten material is sprayed into a cooling atmosphere. Provision is also made for the removal of certain impurities which are usually present in the commercial materials. As a result of the treatment involving the melting and spraying operations and the removal of impurities, products in the form of uniformly dried spherical particles and having improved chemical qualities and physical properties are obtained.

Sodium nitrate is widely used in agriculture, as a fertilizer, and in the chemical industries for various purposes. As is well known, sodium nitrate is hygroscopic, and has a tendency to cake and form hard lumps upon standing in storage. This property or tendency of sodium nitrate makes it difficult to handle for use in the industries, and particularly difficult to use for agricultural purposes. This is particularly true of commercial sodium nitrate in irregularly shaped crystals and in finely grounded forms where intimate and substantially complete contact of the crystal or particle surfaces is permitted. Many commercial sodium nitrate products also contain relatively large amounts of impurities in the form of magnesium compounds, silica, dirt, etc., which make them unsuitable for use in industries requiring relatively pure products.

The present invention contemplates the production of a sodium nitrate product which is suitable for agricultural purposes and which because of its improved form and chemical qualities is suitable for use in industries in which the usual forms of commercial sodium nitrate cannot be used to the best advantage.

In the use of the usual commercial sodium nitrate in agriculture, it has been found that, as a result of the caking tendencies, distribution by the usual agencies is difficult and irregular and results in the over-concentration of the fertilizer in the neighborhood of certain plants with the result that germination is delayed or prevented, while other plants may be insufficiently fertilized to produce the best results. The effect of a fertilizer is dependent not only on its composition, but also on its manner of application. As a result of many experiments, it has been determined that most irregular distribution results when the material is damp and finely ground, and that it drills most uniformly when dry and granulated in the form of spherical particles of uniform size between 10 and 40 mesh.

The sodium nitrate product of the present invention may be obtained in the form of spherical particles of substantially uniform size between 10 and 40 mesh and having a sodium nitrate content of about 99%. This product is obviously suitable for agricultural purposes and for many applications in the chemical industries.

The process of the present invention is applicable to the treatment of commercial sodium nitrate comprising irregularly shaped crystals, and sodium nitrate in finely ground forms, and it is particularly applicable to the treatment of the product described in United States Patent No. 1,516,550, issued November 25, 1924 to E. A. C. Smith.

In accordance with the preferred practice of the present invention commercial sodium nitrate, in any desired form is heated by means of any suitable heating medium to a temperature of about 350° C., somewhat higher than its fusing temperature of about 308° C., and delivered to a spray distributor at a temperature between the fusing point and 350° C. The fused product is passed through a screen of suitable mesh or otherwise treated, for instance, by filtering through mineral wool or other porous material, for the purpose of removing solids contained therein. At a temperature slightly above the fusing point of sodium nitrate, most of the impurities usually found in the commercial product do not melt and are insoluble or very slightly soluble in the fused nitrate. Thus, it is possible, by heating the commercial product to a temperature slightly above the fusing point of sodium nitrate and screening the resulting fluid substance, to effect a substantially complete elimination of all impurities. A low temperature molten nitrate also operates to the advantage of the spraying operation. If the nitrate is heated only sufficiently to provide a product of the proper fluidity, a minimum amount of heat will be contained in the sprayed liquid with the result that, the heat of the liquid may be quickly dissipated and solidification of the particles comprising the spray effected almost immediately. Accordingly, in the preferred practice of the invention, the molten product is maintained at the lowest temperature which will give the material sufficient fluidity to permit screening or filtering and the carrying out of a subsequent spraying operation. I have found it to be advisable to heat the material to about 350° C. in the melting pots, and provide means for cooling the molten material at points between the melting pots and the spray distributors. This practice permits a very accurate control of the temperature of the molten material as it enters the spray distributor, and is conducive to the production of a uniform product.

Of course, the material may be heated in the melting pots to temperatures higher and lower than about 350° C., but I have found that for all practical purposes this temperature is probably the most satisfactory. Lower temperatures do not ordinarily provide a great enough temperature range in the event that the molten material is to be conducted any considerable distance from the melting pots to the spray distributors. In such cases there may be danger of the material freezing in the conduits leading to the spray distributors or in the spray distributors themselves. In a well designed plant, temperatures higher than about 350° C. are wasteful and unnecessary. The heat contained in the material at a temperature of about 350° C. is sufficient to allow for all normal losses in conducting the molten material from the melting pots to the spray distributors and still provide an excess which may be dissipated immediately before the material enters the spray distributors for the purpose of temperature control.

The screened or filtered fluid product is conducted from the melting pot to a spray distributor provided with nozzles of a suitable bore and forcibly projected through the nozzles into a cooling atmosphere. The form and size of the nozzles are rather important, and while many different forms of nozzles may be used, I have found the funnel-shaped nozzles having cylindrical and conical sections and the rims of the conical sections of which are rounded operate to the best advantage. This type of nozzle provides for a low velocity of the molten material at the entrance end and a high velocity at the exit end. The molten nitrate is preferably forced through the nozzles under its own hydrostatic head, but pressure may be supplied in any suitable manner.

The nitrate may be sprayed into a cooling chamber of any suitable type and any suitable means may be utilized for conducting heat away from the spray and for chilling the particles. However, very good results are obtained when a blast of any suitable cooling gas such as air is directed against or along the spray in the direction of its flow. In such cases, the particles comprising the spray may be chilled and solidified almost instantaneously. In this connection it may be noted that a relatively low temperature of the molten nitrate also operates to the advantage of the cooling feature of the process. Since, in accordance with the preferred practice of the invention, the nitrate is heated only sufficiently to provide for a product of the proper fluidity, a minimum amount of heat will be contained in the sprayed liquid with the result that the dissipation of the heat is a relatively simple matter. As a matter of fact, in some tests the temperature of the nitrate in the spray distributors was observed to be a few degrees below the normal solidifying point, indicating a slight supercooling.

Any suitable receptacle may be properly disposed to receive the solidified particles, and the collected material may be bagged and shipped in the usual manner. However, I prefer to use a cooling chamber which is suitably enclosed and provided with a hopper bottom for the reception of the granulated material.

The preferred apparatus for carrying out the method of the invention comprises a melting pot or receptacle of any suitable material which may be heated in any suitable manner. The melting pot is preferably formed of cast iron, set in a down draft setting, and means are provided for introducing the material into the pot at the top. As a result of this arrangement the material is introduced into the hottest region of the melting unit and the coldest gases pass the outlet, thus establishing the minimum temperature differential between the outgoing material and the outgoing gases. For the purposes of removing solid substances from the molten material, a screen of suitable mesh may be placed within and a short distance above the bottom of the melting pot.

A cooling chamber is disposed adjacent the melting unit, and a spray distributor is positioned within the cooling chamber, preferably at lower level than the normal level of molten material within the pot in order to permit the molten material which is conducted through a suitable pipe to the spray distributor to be forced through the nozzles of the distributor under its own hydrostatic head. The nozzles of the spray distributor are preferably so disposed that their axes form an angle of about 75° with the horizontal in order that the spray may be permitted to have the maximum of flight without tending to fall back upon the distributor and other portions of the apparatus.

For the purpose of cooling and solidifying the particles comprising the spray, a pipe is positioned within the cooling chamber in such a manner as to permit a blast of cooling gas to be directed along the spray between the distributor and the apex of the spray.

The spray distributor is equipped with the required number of nozzles to take care of required capacities. Various shapes of nozzles may be employed satisfactorily.

The invention will be better understood from a consideration of the following detailed description of the apparatus read in conjunction with the accompanying drawings in which Fig. 1 is a sectional elevation showing an arrangement of the various units of the apparatus;

Fig. 2 is a side elevation of the spray distributor, a portion being broken away to show the nozzles;

Fig. 3 is a section taken substantially along line 3—3 of Fig. 2;

Fig. 4 is a plan of the spray distributor showing the nozzle arrangement; and

Fig. 5 is an enlarged section showing a preferred form of nozzle.

The drawings show preferred forms of apparatus and a preferred arrangement of the various units of the complete apparatus.

Melting pots 10 are disposed on opposite sides and adjacent the top of a cooling chamber 11. The melting pots are mounted within heating chambers 12 in spaced relation to the side walls and bottoms thereof. Screens 18 are mounted within the melting pots in spaced relation to the bottoms thereof. These screens may be spaced any suitable distance from the bottoms, but I have found that in using a pot having a depth of about 10 feet the screen may be advantageously spaced about four feet from the bottom. Combustion chambers 13 provided with oil burners 14 are disposed immediately adjacent the heating chambers. Passages 15 provide means of communication between the combustion chambers and the upper portions of the heating chambers, and permit the introduction of hot gases of combustion into the heating chambers. Exit openings 16 for removing the waste gases are provided adjacent the bottom of the heating chamber. From the exit openings 16, the waste gases are conducted to a suitable flue or stack (not shown).

The upper walls of the heating chamber comprise removable plates 17 which also serve as covers for the melting pot and thus serve not only to confine the heating gases within the heating chamber at the top, but also to protect the contents of the melting pot and confine the heat therein.

The material to be treated is conveyed by means of screw conveyors 20 from storage bins (not shown) to points immediately above the melting pots, from where it is conveyed by means of drag conveyors 28 to tubes 21 which communicate with the interiors of the melting pots through apertures in the cover plates 17.

Pipes 22 communicate with the bottom portions of the melting pots and serve to conduct the molten material to spray distributors 23 which are mounted within the cooling chamber 11 adjacent the top and at the sides thereof. As illustrated in Figs. 2 to 4, inclusive, the upper walls of the spray distributors are each provided with a plurality of openings or nozzles through which the molten material may be forced. The distributors are preferably so mounted within the cooling chamber that the axes of the nozzles are disposed at an angle of about 75° with the horizontal, in order to obtain the maximum time of flight of the particles from the nozzles without having the molten or cooled material fall back upon the distributors. Conduits 24 communicate with the interiors of the distributors and provide for the insertion of thermometers into the outgoing material to permit temperature regulation and control.

The distributor 23 is preferably provided at one end with an aperture flange 25 and connected by means of wedged bolts 26 to a similarly apertured flange 27 on the elbow 30 which is mounted on the pipe 22. The distributor comprises a main body portion having a small inlet end and a relatively large outlet end surrounded by a connecting flange 31. A nozzle plate 32 is bolted to the flange 31 and forms an end wall of the distributor. Both the main body portion of the distributor and the nozzle plate may be constructed of any suitable material, but I prefer to use either steel or aluminum.

Fig. 5 shows a very satisfactory form of funnel-shaped nozzle. Nozzles of this type preferably have the following dimensions; inlet diameter (d) of the conical section, not less than about .125 inches; depth (b) of the conical section about $\frac{7}{32}''$; diameter (c) of the cylindrical section about .020 inches; and length (a) of the cylindrical section about $\frac{1}{32}''$. The inlet end edge or rim of the conical section of each nozzle should be rounded. The funnel-shaped type of nozzle may be formed by first drilling a hole of uniform bore, then reaming out a portion of the passage thus formed with a tool of the proper size and shape, and finally buffing or polishing the inside of the cylindrical hole.

The axes of the nozzles preferably extend at right angles to the surfaces of the plate 32. When the distributor is in its operative position the longitudinal edges of the nozzle plate extend substantially horizontally while the transverse edges are disposed at an angle to the horizontal. In using this arrangement of the nozzle plate, I have found it advisable to so place the nozzles that, transversely of the plate, no two nozzles will be in alignment. A preferred arrangement of nozzles is shown in Fig. 4. By means of this arrangement of nozzles it is possible to avoid having material issuing from a higher nozzle, without becoming detached from the nozzle plate at the time of its issuance, flow over a lower nozzle and interfere with its performance.

Air or cooling gas pipes 33 are positioned beneath the distributors within the cooling tower 11. Each of these pipes is so arranged that cooling gases issuing therefrom flow along a spray in the same direction and strike the spray at a point near the apex on the upward flight side.

The molten fluid conduits 22 are provided with metal fins or vanes 41 at points adjacent the spray distributors, and conduits 42 are provided for the purpose of directing cooling gas against the fins or vanes and thus aiding in dissipating the heat of the molten fluid before it enters the spray distributors. The upper end portions of the conduits 42 are enlarged so as to surround the fins, and butterfly valves or dampers 43 are provided above the fins for the purpose of controlling the flow of gas through the conduits 42. Any suitable means, such as oil, may be used for cooling the fluid in the conduits 22, but I found the use of air to be economical and satisfactory. When a blast of air is used for chilling the spray, it is generally advisable to use air for cooling the molten fluid, as a supply is readily available.

The cooling chamber is provided with a hopper bottom having a central discharge outlet 34. A screw conveyor 35 is positioned beneath the discharge outlet and may serve a battery of cooling chambers for delivering material therefrom to a second screw conveyor 36 which leads to a bucket elevator 37. The bucket elevator delivers material to a bagging apparatus 38. A plant adapted for carrying out the invention may be provided with the usual plant accessories, such as, for instance, an overhead crane 40, for removing and positioning the cover plates 17, melting pots 10, and other superimposed equipment.

In operating the apparatus for the purpose of carrying out the process and obtaining the product of the invention, the commercial sodium nitrate to be treated is placed within the melting pots 10 and heated to a temperature of about 350° C. at which temperature the sodium nitrate content of the product is in a molten fluid condition. The molten material is conducted through the pipes 22 to the spray distributors 23, cooled to a temperature near its solidifying point by means of a blast of air playing on the fins 41, if necessary, and forced through nozzles in the plates 32 by its own hydrostatic pressure. I have found that if melting pots about ten feet deep are employed and the nozzle plates are disposed at or near the same levels as the bottoms of the pots, satisfactory sprays are produced if the levels of the molten material are maintained near the tops of the melting pots.

Solid materials suspended in the molten material are deposited on the screens 18 as the molten material passes downwardly therethrough and to the spray distributors through the pipes 22.

The sprays extend upwardly a distance of several feet, form relatively sharp arcs or apexes, as indicated in dotted lines in the drawings, and fall to the bottom of the cooling chamber in substantially the center thereof. The air blasts or cooling gas blasts issuing from the pipes 33, chill and solidify the particles comprising the spray almost instantaneously. The solidified particles fall through the cooling chamber to the hopper bottom, from where they may be conveyed as desired by means of the screw conveyors 35 and 36 and the bucket elevator 37 to the bagging or sacking apparatus 38.

Under certain conditions it is unneccessary to direct a blast of cooling gas against the spray in order to effect solidification of the particles comprising the spray. Thus, if the molten material is sprayed at a temperature near its solidifying point, under a hydrostatic head of about ten feet, and through nozzles or apertures of about 0.020 inch diameter, the particles comprising the spray will solidify sufficiently during a fall of about twenty feet at ordinary atmospheric temperatures.

The process is preferably carried on continuously, fresh commercial sodium nitrate being fed to the melting pots as the molten material is sprayed. Thus, a uniform hydrostatic head may be maintained, which condition promotes the production of a uniform product.

The product obtained is in the form of substantially spherical particles of anhydrous sodium nitrate. The material forming the particles may be relatively pure and relatively non-hydroscopic as the result of the elimination of magnesium compounds and other impurities. A number of tests have indicated that from quantities of commercial sodium nitrate having an average sodium nitrate content of about 97.5%, a product having an average sodium nitrate content of about 99% is obtained.

The spherical particles have smooth, hard surfaces and they are of sufficient strength to permit ordinary handling for packing and shipping purposes without crushing. In packing, the particles are passed through chutes and down inclines, including drops of several feet, and they have been found to satisfactorily withstand such treatment and retain their spherical forms.

The particles are free-running and eminently suited for drilling in agriculture. Even when slightly damp they do not lose their drillability. By virtue of the fact that the particles are spherical, they present a minimum surface area for the deposition of moisture from the atmosphere. Furthermore, since the particles are spherical, the contact areas between the particles are reduced to a minimum, and, thus, the caking tendency is reduced. A body of the particles contains a large percentage of voids, which condition permits efficient percolation when the product is used in industries in which immersion of the product in liquid is desirable.

The following screen analysis indicates the relative proportions of the various sizes of particles comprising an average product which I have found to be well suited for drilling in agriculture.

| Mesh | Percentage |
|---|---|
| +8 | 00.00% |
| +10 | 16.00% |
| +14 | 66.90% |
| +20 | 12.00% |
| +28 | 2.50% |
| −28 | 1.80% |

According to the preferred practice of the process of the invention, a product comprising substantially spherical particles of uniform size between 10 and 40 mesh is obtained. However, products of varying sizes may be produced, if desired, by varying the spraying temperature or pressure, or by varying the sizes or shapes of the spraying nozzles.

I claim:

1. The method of producing an improved sodium nitrate product which comprises heating commercial sodium nitrate to produce a molten fluid mass having a temperature not exceeding about 350° C., screening said fluid to remove solids therefrom, conducting said fluid to a spray device and reducing its temperature to a point as near its solidification temperature as is compatable with the fluidity necessary for the spraying, and spraying said fluid into a cooling atmosphere having a temperature such that a hard, smooth surface is practically immediately formed on the sprayed particles.

2. In a method of producing an improved sodium nitrate product, the steps which comprise heating commercial sodium nitrate to a temperature sufficiently high to liquefy the sodium nitrate contained therein but not high enough to effect solution or liquefaction of impurities contained therein, and separating the solid impurities from the molten sodium nitrate.

3. In a method of producing an improved sodium nitrate product, the steps which comprise heating commercial sodium nitrate to a point where a molten mass is obtained having a temperature not exceeding about 350° C., and screening said molten mass to remove the solid constituents therefrom.

GEORGE HOMER GLEASON.